United States Patent [19]

Miyahara

[11] 4,339,548

[45] Jul. 13, 1982

[54] POROUS CEMENTED ION EXCHANGE RESINS WHEREIN THE BEADS ARE COHERED TO ONE ANOTHER IN POLYMER MATRIX

[75] Inventor: Akimitsu Miyahara, Tokyo, Japan

[73] Assignee: Rohm and Haas Company, Philadelphia, Pa.

[21] Appl. No.: 186,795

[22] Filed: Sep. 12, 1980

[51] Int. Cl.$^3$ .................. B01J 39/08; B01J 41/08
[52] U.S. Cl. ............................................. 521/28
[58] Field of Search ........................................ 521/28

[56] References Cited

U.S. PATENT DOCUMENTS 3,645,922  2/1972  Weiss et al. ............................ 521/28

FOREIGN PATENT DOCUMENTS 2421290   2/1979  France ................................. 521/28
50-33988  2/1975  Japan .................................. 521/28
907071   10/1962  United Kingdom ................. 521/28

*Primary Examiner*—William F. Hamrock
*Assistant Examiner*—Peter F. Kulkosky

[57] ABSTRACT

A method for preparing a cementitious ion-exchange resin comprising treating cation- or anion-exchange resin particles having an effective diameter of from about 0.1 to about 1 mm with a material selected from the group consisting of polyacrylate emulsions, polyvinyl alcohol, and polyvinyl acetate, the material having a hydrophilic group, drying the treated ion exchange resin into a cementitious mass, and optionally reducing the particle size of the mass to provide cementitious ion exchange resin grains having an effective diameter of from about 2 to about 50 mm.

17 Claims, No Drawings

POROUS CEMENTED ION EXCHANGE RESINS WHEREIN THE BEADS ARE COHERED TO ONE ANOTHER IN POLYMER MATRIX

This invention relates to a method for producing ion exchange materials of large dimensions, including large resin grains and cemented resin structures, which method comprises cohering ordinary, minute cation-exchange and anion-exchange resin particles into coarse, cementitious ion-exchange resin grains or structures by the use of a polymeric composition possessing a hydrophilic group.

The ion-exchange resins which are usable in the practice of this invention are those which are ordinarily available in the market and are extensively used for such application as the deionization of water. They come in effective diameters in the range of from about 0.1 to about 1 mm, preferably from about 0.3 to about 0.7 mm, and more preferably from about 0.4 to about 0.65 mm. Generally, when an ion exchange resin is used for ion exchange or catalytic reactions, the surface area and the reaction rate of the ion exchange resin increase in proportion to the decrease in effective particle diameter of the ion-exchange resin. Such a decrease in the particle diameter entails the disadvantage of an increase in the pressure drop across a bed of the resin during continuous-flow treatment.

Ordinary ion-exchange resins which possess effective diameters in the range of from about 0.4 to about 0.65 mm are used for the treatment of various kinds of solutions without excessive pressure drop or inadequate reaction rate. In special cases, such as the treatment of gases, it is often desirable to use ion-exchange resins with particle sizes larger than 0.65 mm. Treatment of a gaseous substance calls for high flow rates, on the order of tens to hundreds of cubic meters per hour, with a consequent increase in pressure drop across the ion-exchange bed. Especially where ion-exchange resins are used for catalyst, resins having particle diameters considerably greater than those prevalent today are advantageous for packing the columns. Manufacture of such coarse ion-exchange resin grains is, however, quite difficult, and the size of the grains contributes to a reduction in the reaction rate.

This invention aims to eliminate these difficulties. Specifically, the invention relates to a method for the granulation of an ion-exchange resin, which method comprises cohering ordinary ion-exchange resin particles possessing an effective diameter of from about 0.1 to about 1 mm, preferably from about 0.3 to 0.7 mm, and more preferably from about 0.4 to about 0.65 mm into cementitious grains possessing an effective diameter of from about 2 to about 50 mm by the use of a polymeric composition having a hydrophilic group, such as hydroxyl group or carboxyl group.

When a popular adhesive agent such as, for example, an epoxy resin is used to cohere individual ion-exchange particles into coarse, cementitious ion-exchange resin grains, the adhesive agent also forms a film over the surface of the individual ion-exchange particles. Since this film is hydrophobic, it inhibits contact between the resulting ion-exchange grains and the solution to be treated, thus reducing ion-exchange effectiveness. To solve this problem, the inventors conducted an extensive study on organic polymers known to possess an adhesive property. They have discovered that the use of a polymeric composition possessing an hydrophilic group, such as hydroxyl group or carboxyl group, permits minute ion-exchange particles to be powerfully cohered by a film permeable to water and ions. Specific examples of polymers possessing hydrophilic groups are polyvinyl alcohol, polyvinyl, acetate, and acrylic polymers.

Ion-exchange resin particles are cohered with a polyvinyl alcohol polymer composition, for example, simply by dissolving a polyvinyl alcohol in water, mixing the resulting solution with diisocyanate as the crosslinking agent, intimately mixing the resulting mixture with the ion-exchange resin particles to cause the particles to adhere to one another and solidify, and drying the resulting, cementitious composite. Thereafter the dry mass may be crushed to obtain a desired grain size. Acrylic polymer compositions may be used to cohere ion-exchange resin particles by mixing a polyacrylate emulsion with ion-exchange resin particles to cause the particles to adhere to one another and solidify, and drying the resulting cementitious composite. Thereafter the dry mass may be crushed to obtain the desired grain size. In either case, the ion-exchange grains resulting from the crushing are segregated, as by screening, to collect the grains having an effective diameter in the desired range, preferably from about 2 to about 50 mm. Cementitious ion-exchange resin grains having the preferred effective diameter of from about 2 to about 50 mm can otherwise be preformed, as by vigorously agitating the composite mixture during the cohering step.

When ion-exchange resin particles are cohered by the use of a polymeric composition possessing a hydrophilic group according to the present invention, use of excessive amounts of polymeric composition proves disadvantageous because the composition so used lowers the ion-exchange reaction rate despite the hydrophilicity of the cohering film. Conversely, use of inadequate amounts is also disadvantageous because the cohered grans have inferior cohesive strength. It is advantageous to use the polymeric compositions in an amount in the range from about 5 to about 15 g, and preferably about 10 g, per 100 g of the ion-exchange resin particles in their wetted state.

For use as the adhesive agent in the practice of the present invention, acrylic polymeric compositions are superior to polyvinyl alcohol or polyvinyl acetate compositions in terms of strength exhibited by the coarse, cementitious ion-exchange resin grains. Some polyacrylate emulsions form alkali-soluble, cementitious films; when such an alkali-soluble polyacrylate emulsion is used in the present invention, cementitious ion-exchange resin grains having more desirable properties may be produced by mixing this polyacrylate emulsion with a small amount of an alkali-insoluble polyacrylate emulsion and, after the ion-exchange resin particles have been cohered by the polymer emulsion, immersing the grains in an alkali solution. When the film formed of this mixture of alkali-soluble and alkali-insoluble polyacrylate emulsions contacts the alkali solution, only the alkali-soluble portions of the film dissolve out to leave the film in a porous state. Consequently, the film assumes a state which is well suited to the free passage to water and ions.

When an alkali-soluble polyacrylate emulsion is used in a mixture with an alkali-insoluble polyacrylate emulsion, an excess of the former emulsion in the mixture results in a reduction in the strength of the cementitious product. Preferably, the amount of the former emulsion is in the range of from about 2 to about 10%, and more preferably about 5%, based on the total weight of the polymer mixture.

The ion-exchange resin to be used in the present invention are ordinary ion-exchange resins which possess an effective diameter preferably in the range of from about 0.1 to about 1 mm, preferably from about 0.3 to about 0.7 mm, and more preferably from about 0.4 to about 0.65 mm and are commercially available. Use of a finely powdered ion-exchange resin is not suitable for the purpose of this invention, because excessive amounts of the adhesive must be used to adequately cohere the ion-exchange particles, and the cementitious product possesses inadequate physical strength.

The preferred particle-size range of the coarse, cementitious ion-exchange resin particles produced according to the present invention is within the range of from about 2 to about 50 mm. When the coarse cementitious grains have an effective diameter of less than about 2 mm, for example, they are so small as to approach substantially the prevalent effective diameter of ordinary ion-exchange resins. When the grains have an effective diameter exceeding 50 mm, they again prove less desirable because interstices which occur between the grains when they are used to pack an ion-exchange column are so large that various adverse effects occur, such as channeling of treated fluid through a bed region of low resistance, and hence limited resin contact. Most preferably, therefore, the grains should be produced in an effective diameter of from about 5 to about 10 mm. For certain specialized applications, it is advantageous that an entire ion exchange resin bed be cemented into a single unit, or that a portion of such a bed be so cemented, as for example a thin wafer at the bottom of a resin bed which acts as a bottom screen for the bed. Such large, cementitious ion-exchange resin structures may be prepared using the method of the present invention.

As described above, the coarse, cementitious ion-exchange resin grains of the present invention possess porous grains as a result of the water permeability of the cementitious film. Despite their large effective diameter, therefore, the coarse ion-exchange grains do not lower the ion-exchange reaction rate for the ion-exchange material. The coarse, cementitious ion-exchange resin grains which are obtained by the method of this invention exhibit outstanding properties in the treatment of gaseous substances or in catalysis reactions with liquids or gases, in addition to their excellent properties for treating liquids.

The following example is intended to illustrate the present invention, but not to limit it except as it is limited in the claims. All percentages are by weight unless otherwise specified.

EXAMPLE

Amberlite ® 200C ion-exchange resin, a strongly acidic macroreticular cation-exchange resin bearing sulfonic acid functionality, was wetted, and 100-g samples of the resin were treated with one of the following mixtures of polymeric emulsions:

| Mixture 1 | |
|---|---|
| Ingredient | Amount |
| Rhoplex ® AC-61 Acrylic Polymer Emulsion | 9 g |
| Rhoplex ® LC-40 Acrylic Polymer Emulsion | 1 g |
| Acrysol ® T-6N Acrylic Polymer Emulsion | 0.5 g |
| Acrysol ® ASE-60 Acrylic Polymer Emulsion | 0.05 g |

| Mixture 2 | |
|---|---|
| Ingredient | Amount |
| Rhoplex ® AC-61 Acrylic Polymer Emulsion | 9 g |
| Rhoplex ® LC-40 Acrylic Polymer Emulsion | 1 g |
| Acrysol ® ASE-60 Acrylic Polymer Emulsion | 0.05 g |

Each of the components of the above mixtures contains a polycarboxylic acid, principally methacrylic acid. Acrysol ® P-6 N is alkali soluble, while the remaining three polymer emulsions are alkali insoluble. Each of the emulsions and the ion-exchange resin are available from Rohm and Haas Company, Independence Mall West, Philadelphia, Pa., 19105.

The polymer-treated resin samples were dried at 30° C. for about 6 hours to produce cemented lumps of resin beads. The lumps of resin beads treated with Mixture 1 were immersed in an aqueous, 2% caustic soda solution for about 3 hours to dissolve the alkali-portion of the cementing polymer mixture, and were subsequently dried again at normal room temperature. The solid lumps of each sample were crushed with a hammer into grains having an effective diameter of about 5 mm. These grains of strongly cohered ion-exchange resin particles were tested for regeneration efficiency as described below.

The samples of cementitious ion-exchange resin grains were each placed in an ion-exchange column and an aqueous 5% hydrocholoric acid solution was passed through the column at the rate of 5 bed volumes per hour to determine the regeneration efficiency. For comparison, the same weight of the same ion-exchange resin in its uncemented form was treated with the aqueous 5% hydrochloric acid solution under the same conditions as indicated above, to determine the regeneration efficiency. The results of these tests are shown in Table I.

TABLE I

| | Percent Regeneration | | |
|---|---|---|---|
| | | Cementitious Resin Grains | |
| Equivalents of HCl per Equivalent of Resin | Uncemented Resin Beads | Partially Alkali-Soluble, Alkali-Treated Film | Alkali-Insoluble Film |
| 1 | 65.0 | 63.5 | 60.5 |
| 2 | 82.0 | 81.0 | 78.5 |
| 3 | 90.5 | 89.0 | 86.5 |
| 4 | 95.0 | 94.0 | 91.5 |
| 5 | 97.5 | 96.5 | 94.0 |
| 7 | 99.5 | 98.5 | 97.0 |

It is clear from the above table that the regeneration efficiency of both cementitious ion-exchange resin samples of the present invention are substantially the same as that of the uncemented resin.

I claim:

1. Cementitious ion exchange resin particles having an effective diameter of from about 2 to about 50 millimeters comprising organic ion exchange resin beads having an effective diameter of about 0.1 to about 1 millimeter cohered to one another by a crosslinked cementitious matrix derived from an adhesive material containing a hydrophilic functional group and selected from the group consisting of polyacrylate emulsions, polyvinyl alcohol and polyvinyl acetate wherein the cementitious matrix is present at a level of to about 15 grams per 100 grams of on exchange particles in their wetted state.

2. The cementitious ion exchange resin particles of claim 1 wherein the effective diameter of the ion exchange resin beads is from about 0.3 to about 0.7 millimeters.

3. The cementitious ion exchange resin particles of claim 1 wherein the effective diameter of the ion exchange resin beads is from about 0.4 to about 0.65 millimeters.

4. The cementitious ion exchange resin particles of claim 1 wherein the adhesive material containing a hydrophilic functional group is a polyacrylate emulsion.

5. The cementitious ion exchange resin particles of claim 4 wherein the hydrophilic functional group is he carboxylic acid group.

6. The cementitious ion exchange resin particles of claim 4 wherein the hydrophilic functional group is the hydroxyl group.

7. The cementitious ion exchange resin particles of claim 4 wherein the polyacrylate emulsion is an alkali-insoluble emulsion.

8. The cementitious ion exchange resin particles of claim 4 wherein the polyacrylate emulsion comprises an alkali-insoluble emulsion and an alkali-soluble emulsion.

9. A cementitious ion exchange resin bed or portion thereof comprising organic ion exchange resin beads having an effective diameter of from about 0.1 to about 1 millimeter in a cementitious matrix derived from an adhesive material containing a hydrophilic functional group and selected from the group consisting of polyacrylate emulsions, polyvinyl alcohol and polyvinyl acetate wherein the cementitious matrix is present at a level of to about 15 grams per 100 grams of on exchange particles in their wetted state.

10. A method for preparing a cementitious ion exchange resin comprising organic treating particles of an ion exchange resin having an effective diameter of from about 0.1 to about 1 millimeter with an adhesive material having a hydrophilic functional group and selected from the group consisting of polyacrylate emulsions, polyvinyl alcohol and polyvinyl acetate, and drying the treated ion exchange resin into a cementitious mass wherein the cementitious matrix is present at a level of to about 15 grams per 100 grams of on exchange particles in their wetted state.

11. The method of claim 10 wherein the cementitious mass, subsequent to drying, is reduced in particle size to particles of cementitious ion exchange resin having effective diameters between about 2 and about 5% millimeters.

12. The method of claim 11 wherein the particles of ion exchange resin prior to treatment have an effective diameter of from about 0.3 to about 0.7 millimeters.

13. The method according to claim 11 wherein the hydrophilic functional group is the carboxylic group.

14. The method according to claim 11 wherein the hydrophilic functional group is the hydroxyl group.

15. The method of claim 11 wherein the adhesive material bearing a hydrophilic functional group is a polyacrylate emulsion.

16. The method according to claim 15 wherein the polyacrylate emulsion is an alkali-insoluble emulsion.

17. The method according to claim 15 wherein the polyacrylate emulsion comprising an alkali-insoluble emulsion and an alkali-soluble emulsion.

* * * * *